United States Patent [19]

Scott

[11] 3,728,919
[45] Apr. 24, 1973

[54] BROKEN TOOL DETECTOR

[75] Inventor: William B. Scott, Steward, Ill.

[73] Assignee: W. A. Whitney Corp., Rockford, Ill.

[22] Filed: Nov. 15, 1971

[21] Appl. No.: 198,689

[52] U.S. Cl. ..........................83/62, 83/686, 175/39, 408/6
[51] Int. Cl. ......B26d 7/22, E21b 13/00, B23b 49/00
[58] Field of Search ......................83/62, 686; 408/6; 175/39

[56] References Cited

UNITED STATES PATENTS 2,468,905  5/1949  Warren, Jr. .............................175/39
2,953,044  9/1960  Kimble et al. .............................408/6
3,241,402  3/1966  Crowell et al. ...........................408/6

*Primary Examiner*—Andrew R. Juhasz
*Attorney*—Wolfe, Hubbard, Leydig, Voit & Osann, Ltd.

[57] ABSTRACT

A portion of a pneumatic circuit for sensing the breakage of a punch is formed by a normally closed passageway in the punch itself. If the punch is broken, the passageway is opened up and pressurized air in the circuit is vented to the atmosphere through the passageway. A pressure differential switch in the circuit senses the resulting pressure change and, in response thereto, produces an electric signal to indicate breakage of the tool.

5 Claims, 3 Drawing Figures

PATENTED APR 24 1973
3,728,919
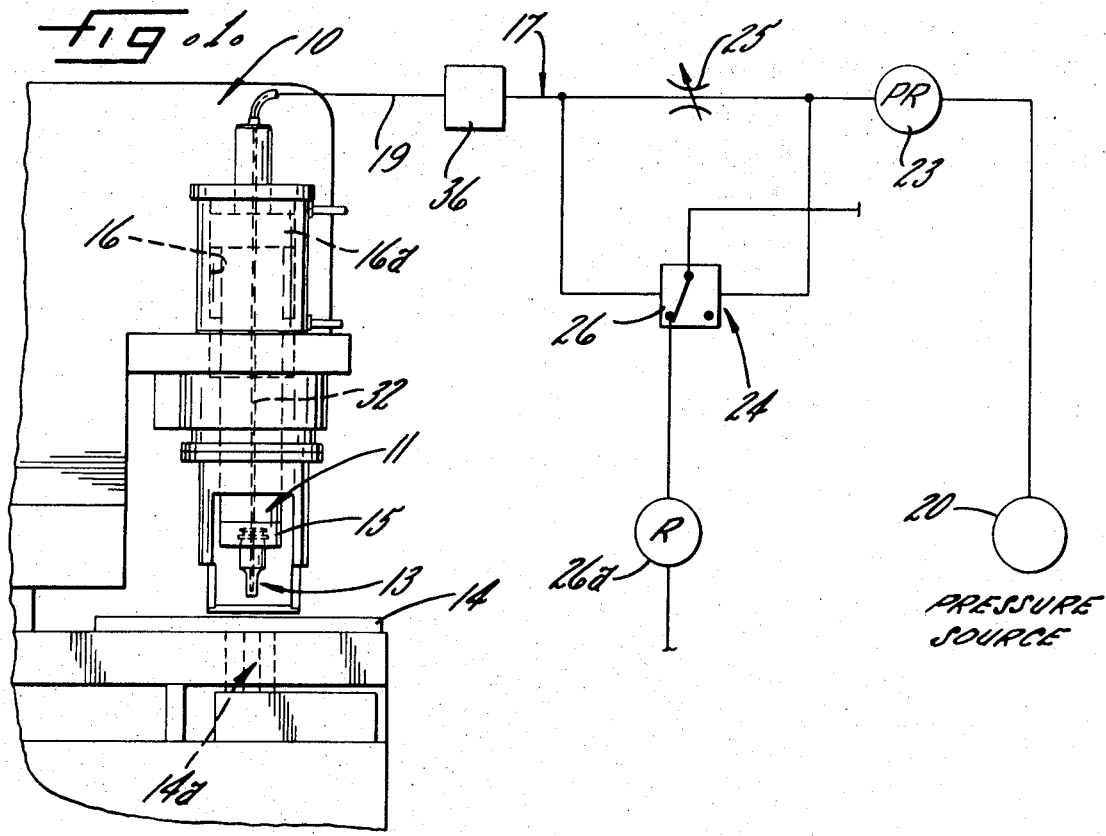
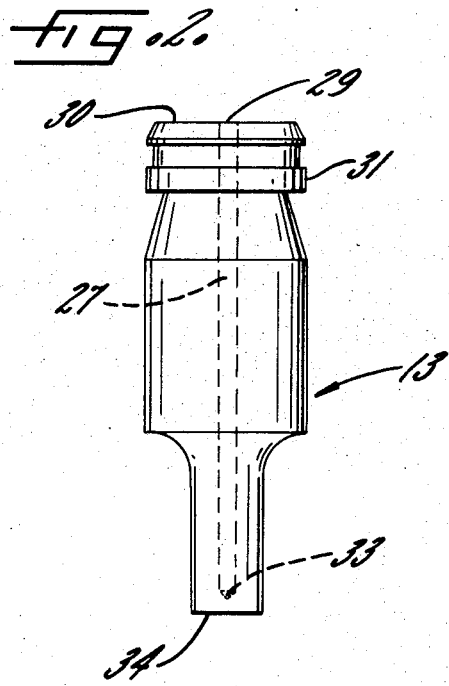

BROKEN TOOL DETECTOR

BACKGROUND OF THE INVENTION

The present invention relates to a detector for use in a machine tool to sense the breakage of a tool element and, more particularly, to a detector of the type in which breakage of the tool element is sensed by detecting pressure changes which occur in a pneumatic circuit as a result of the tool breaking.

SUMMARY OF THE INVENTION

The general object of the present invention is to provide a new and improved broken tool detector of the above general character which is simpler, less expensive and easier to use than prior detectors.

A further object is to provide a detector which is particularly adapted for use with reciprocating tools and which is quicker to signal that the tool element has been broken so that damage to the workpiece or the machine tool can be avoided.

Another important object is to provide a detector including, in addition to the foregoing advantages, a pressure circuit which is hooked up and ready for operation as an incident to normal installation of the tool element and which does not inhibit the tool changing operation or introduce additional time consuming steps in order to put the detector into service.

In a more detailed sense, the invention resides in the unique and simple construction of an air passage in the tool element itself, the passage forming part of and normally closing the pneumatic circuit but opening up and venting the circuit to atmosphere upon breakage of the tool thereby to create a pressure change indicative of the breakage.

These and other objects and advantages of the present invention will become readily apparent from the following detailed description when taken in conjunction with the accompanying drawings.

BRIEF DESCRIPTION OF THE DRAWINGS

FIG. 1 is a schematic diagram of the broken tool detector system embodying the novel features of the present invention.

FIG. 2 is an enlarged elevational view of an exemplary tool adapted for use in the system.

FIG. 3 is an enlarged elevational view of a broken tool.

DETAILED DESCRIPTION OF THE PREFERRED EMBODIMENT

As shown in the drawings for purposes of illustration, the present invention is embodied in a machine tool 10 with a movable carrier 11 which supports a tool element 13 for performing work on a workpiece 14. Herein, the machine tool includes a novel system for detecting the breakage of the tool element during the normal operation of the machine tool.

While the detector system of the present invention is equally well suited for use in many various types of machine tools, the machine tool 10 disclosed specifically herein is a punch press and the carrier 11 is a reciprocable ram. The tool element 13 is a punch which is supported on the lower end of the ram by a punch holder 15. In operation, the ram is reciprocated in response to the admission of hydraulic oil alternately into opposite ends of a cylinder 16 housing a piston 16a to which the ram is connected. On the downstroke of the ram, the punch is driven through the workpiece 14 and into an underlying die 14a to punch a hole in the workpiece.

As shown in FIG. 1, the detector system includes a pneumatic circuit 17 having a fluid pressure line 19 communicating with a pressure source 20 and leading toward the punch 13. The downstream end of the line is blocked by the punch to keep air in the line from escaping. A pressure regulator 23 connected in the line keeps the air pressure in the line at a preselected value during normal punching operations. If the punch is broken during a punching cycle, the end of the line is unblocked and air can escape thus causing a change in the pressure in the line. To detect this change from the preselected pressure value, a pressure detector 24 is connected between the end of the line and the pressure regulator. In response to detecting a change of pressure, the detector produces an electric signal thereby indicating breakage of the punch.

Herein, the pressure detector 24 preferably includes an adjustable restriction in the form of a needle valve 25 located in the fluid pressure line 19 to restrict the flow of air in the line past the detector. As long as the punch 13 blocks the flow of air from the line, there is no or substantially no flow of air across the needle valve and as a result, there is practically no pressure drop across the needle valve. When the punch 13 is broken, however, the air escapes rapidly from that portion of the line downstream of the needle valve and causes a much faster flow of air through the needle valve from the upstream portion of the line. This results in the creation of a larger pressure drop across the opposite sides of the needle valve. A differential pressure switch 26 is connected in parallel with the needle valve and is sensitive to the differential pressure across the valve. When the differential pressure rises to a preselected level, the switch triggers and produces an electric signal indicative of breakage of the punch.

The signal may be used simply to turn on a light indicating to the punch press operator that the punch 13 is broken or preferably, as in the present instance, the signal is used to shut down the automatic punching cycle of the punch press 10 by de-energizing a relay 26a to cause centering of a valve (not shown) and thereby stop the flow of hydraulic oil to cylinder 16. In any event, it is desirable that the breakage of the punch be detected as soon as possible so that the punch press may be stopped quickly to keep the broken punch from causing damage to the workpiece 14 or to the punch press itself. For this reason, the needle valve 25 and pressure differential switch 26 arrangement is preferred over a simple pressure switch because of the quick response time of such an arrangement.

In accordance with the primary aspect of the present invention, provision is made of a unique detector system whereby breakage of the punch 13 is detected immediately and without the tool first having to be retracted away from the workpiece 14. For these purposes, the terminal portion of the pneumatic circuit 17 is formed within the punch itself so that, when the punch breaks, the air in the circuit is immediately vented to the atmosphere. More specifically, a normally closed passageway 27 is formed in the punch and, when the latter is mounted in the punch holder 15, the passageway becomes a part of the pneumatic circuit so that breakage of the punch will open up and expose the passageway to allow the air in the circuit to escape and trigger the switch 26. With this unique arrangement, breakage of the tool element is detected immediately during the punching cycle even if the punch is still in the workpiece 14. As a result, reciprocation of the ram 11 may be stopped to prevent damage which otherwise might be caused by the broken tool.

In the present instance, the passageway 27 is a small cylindrical hole drilled axially through the punch 13 with the upper end 29 of the hole opening out the top surface 30 of the enlarged head 31 of the punch. The lower end or bottom 33 of the hole terminates just short of the lower end surface 34 of the punch and thus is closed off. Advantageously, when the punch is inserted into the holder 15, the upper end of the passageway automatically aligns with a passage 32 formed axially through the ram and the holder 15 and communicating with the pressure line 19. Thus, it will be appreciated that the pneumatic circuit 17 is completed and substantially closed off when the punch 13 is mounted on the end of the ram, the punch itself actually forming a portion of and closing off the circuit by virtue of the open end 29 of the passageway 27 communicating with the lower end of the passage 32 and by virtue of the lower end 33 of the passageway 27 being closed. Because the upper end of the passageway 27 may not form a perfect seal with the lower end of the passage 32, a small amount of air may be vented constantly between the punch 13 and ram 11. This possible air leakage, however, would be so small as to cause no pressure drop across the needle valve 25.

When the punch 13 is broken, such as is shown in FIG. 3, the lower end 33 of the passageway 27 is opened thereby permitting the pressurized air to escape from the circuit 17. This, in turn, triggers the pressure differential switch 26 to produce the signal indicating the breakage of the punch so that the punch press 10 may be shut down to enable replacement of the broken punch. If the ram 11 is stopped automatically in its lowered position, the punch press operator can manually jog the ram upwardly to a upper tool change position for the purpose of replacing the punch. Advantageously, when changing punches, the present detector system does not interfere with or complicate the tool changing process since the punch 13 forms a part of the circuit 17 simply by being inserted into the holder 15.

To further facilitate the changing of punches and to avoid unnecessary triggering of the switch 26, a shut off valve 36 is located in the fluid pressure line 19 just downstream of the switch. The valve may be turned off to block the flow of air to the end of the pressure line when changing punches or when it is not desired to use the detector system.

I claim as my invention:

1. In a machine tool for performing work on a workpiece, the combination of, a tool carrier reciprocable toward and away from the workpiece, a tool having a first end mountable on the carrier for movement therewith and having a second end for performing work on the workpiece when said carrier is reciprocated, a passageway formed in said tool and terminating adjacent the second end of the tool, means for pressurizing said passageway with air to a preselected pressure, and means responsive to changes in said pressure resulting from breakage of the tool and venting of the terminal end of the passageway to produce a signal indicating the breakage.

2. A punch press having a ram reciprocable upwardly and downwardly relative to an underlying workpiece, a punch carried on the lower end of the ram for punching a hole in said workpiece during the downstroke of the ram, the improvement in said press comprising, a pneumatic circuit having a passage extending axially of said ram and opening out of the lower end thereof, a passageway extending from the upper end of said punch toward the lower end portion thereof and terminating within the punch in said lower end portion, the upper end of said passageway communicating with the lower end of said passage, means for introducing pressurized air into said passage to pressurize said passageway to a preselected pressure, and means for producing a signal in response to changes in said pressure resulting from breakage of the punch and venting of the lower end of said passageway.

3. A punch press as defined by claim 2 wherein said signal producing means includes a pressure sensitive switch responsive to the pressure between said passageway and said pressurization means and operable to produce an electrical signal as an incident to such pressure dropping below a preselected level.

4. A punch press as defined by claim 3 wherein said circuit includes an adjustable restriction located between and communicating with said pressurization means and said passage, said pressure sensitive switch being a pressure differential switch located between and communicating with said pressurization means and said passage and connected in parallel across said restriction so as to be responsive to changes in the differential pressure on opposite sides of the restriction.

5. A punch press having a ram reciprocable upwardly and downwardly in successive automatic cycles relative to an underlying workpiece, a punch carried on the lower end of the ram for punching a hole in the workpiece during the downstroke of the ram, said punch having an elongated body with an upper head and a lower punching surface, the improvement in said press comprising, a pneumatic circuit having a passage extending axially through said ram and opening out the lower end thereof, a small hole drilled through the head of said punch, extending axially within said body and having a closed lower end spaced just upwardly from the lower punching surface of the punch, said hole communicating with said passage forming a portion of said circuit so that the circuit will be vented to the atmosphere when the lower end portion of the punch is broken to open up the lower end of said hole, means for normally pressurizing the circuit to a preselected pressure different than atmospheric pressure so that the pressure in the circuit will change when the circuit is vented to the atmosphere upon breaking of said punch, and means operable in response to such change in the pressure of the circuit to terminate automatic cycling of the ram.

* * * * *